United States Patent [19]

McGuire et al.

[11] 4,314,880

[45] Feb. 9, 1982

[54] HYDROGEN PERMEATION RESISTANT BARRIER

[75] Inventors: Joseph C. McGuire; William F. Brehm, both of Richland, Wash.

[73] Assignee: The United States Department of America as represented by the United States Department of Energy, Washington, D.C.

[21] Appl. No.: 119,740

[22] Filed: Feb. 8, 1980

[51] Int. Cl.³ .................. G21C 1/02; G21C 3/20; B05D 3/02
[52] U.S. Cl. .................. 376/146; 427/192; 376/305; 376/418
[58] Field of Search .................. 176/9, 67, 82, 40, 38; 427/192; 148/31.5, 6, 6.11

[56] References Cited

U.S. PATENT DOCUMENTS

| | | | |
|---|---|---|---|
| 1,817,888 | 8/1931 | Lowe | 427/192 |
| 2,981,672 | 4/1961 | Kingston | 176/82 |
| 3,073,015 | 1/1963 | Wachtell | 427/192 |
| 3,345,197 | 10/1967 | Martin et al. | 427/192 |
| 3,359,176 | 12/1967 | Antill | 176/82 |
| 3,577,268 | 5/1971 | Whitfield et al. | 427/192 |
| 3,595,712 | 7/1971 | Boone et al. | 427/192 |
| 4,025,288 | 8/1977 | Armijo | 176/82 |

OTHER PUBLICATIONS

Fusion Tech. '78, vol. 2, (9/4–9/78), pp. 841–844, Doll.
Fusion Tech., 9th Symp. (6/14–18/76), pp. 65–71.

*Primary Examiner*—Sal Cangialosi
*Attorney, Agent, or Firm*—Robert Southworth; Richard E. Constant; Richard G. Besha

[57] ABSTRACT

A hydrogen permeation resistant barrier is formed by diffusing aluminum into an iron or nickel alloy and forming an intermetallic aluminide layer.

7 Claims, No Drawings

HYDROGEN PERMEATION RESISTANT BARRIER

The United States Government has rights in this invention pursuant to Contract No. EY-76-C-14-2170 between the U.S. Department of Energy and Westinghouse Electric Corporation.

BACKGROUND OF THE INVENTION

The invention relates to a process for forming hydrogen permeation barriers useful in components of nuclear reactors.

Permeation of hydrogen and its isotopes, such as tritium, through the walls of various components of nuclear reactors has been a potential problem in reactor operation. Solutions for the problem generated by this permeation have focused on the application of organic gettering materials disposed on outer walls of tritium generating sources so as to getter any tritium that permeates through the wall. Other solutions have included the application of a phosphate-radical-containing, phosphate-glass-forming, material on an outer surface of the container of the tritium source.

These proposed solutions have drawbacks which may limit their usefulness in liquid metal fast breeder and fusion reactors. For example, the organic getter material has the limitation that it may become completely saturated with hydrogen, deuterium, or tritium, so as not to be useful unless replaced or otherwise regenerated. An additional drawback to the use of organic coatings is that they may not be stable at the elevated temperature or in the liquid sodium of a nuclear reactor.

Drawbacks of applying a glaze-type material to prevent permeation of hydrogen, or providing a phosphate-glass-type material on a surface, are that these materials may not be compatible with liquid sodium and thus may not be useful if required to be useful in direct contact with molten sodium.

SUMMARY OF THE INVENTION

In view of the above limitations, it is an object of this invention to provide a hydrogen permeation resistant barrier.

It is a further object of this invention to provide a permeation resistant barrier that may be used in direct contact with molten sodium or lithium.

It is a further object of this invention to provide a permeation resistant barrier that will prevent or minimize the permeation of hydrogen and its isotopes through the walls of tritium sources.

It is a further object of this invention to provide a hydrogen permeation resistant barrier which is useful at temperatures up to at least 700° C.

It is a still further object of this invention to provide a hydrogen permeation resistant barrier that may be applied to various metal walls or components of reactors.

It is another object of this invention to provide a hydrogen permeation resistant barrier that is especially useful in liquid cooled fast breeder and fusion reactors.

Various other objects and advantages will appear from the following description of this invention and the most novel features will be particularly pointed out hereinafter in connection with the appended claims.

The invention comprises, in brief, a method for forming a hydrogen permeation resistant barrier by diffusing aluminum into a metal wall, thereby forming a permeation resistant intermetallic aluminide coating.

DETAILED DESCRIPTION

The inventors have discovered that the formation of an intermetallic aluminide coating on certain metals such as austenitic, ferritic, or nickel rich alloys offers a useful barrier to the permeation of hydrogen. Use of aluminum itself would not be suitable because pure aluminum is attacked by sodium and dissolves readily in lithium.

This barrier may be typically formed by any method that diffuses aluminum into the substrate metal and effects an intermetallic reaction. For example, one such method would be to physically coat the metal part with aluminum by a mechanical or chemical method, or simply by dipping the metal part in molten aluminum and then thermally diffusing the aluminum into the metal wall by heating to about 800° C.

Another such method is generally referred to as diffusion pack coating and is exemplified in U.S. Pat. Nos. 3,073,015 and 3,096,705. Here the metal article is embedded in a diffusion coating pack containing, among other things, finely divided aluminum and a vaporizable halogen material. Heating at about 800° C. in a hydrogen atmosphere causes the formation of the aluminide coating.

A third variation is to immerse the metal part in a molten alkali metal bath (preferably lithium) containing dissolved aluminum. The aluminum diffuses into the metal substrate, forming the diffusion barrier.

It has been found that the intermetallic layer on nickel-rich material has the form of intermetallic compounds $Ni_3Al$, $NiAl$, or $NiAl_2$, while the intermetallic layer on austenitic or ferritic stainless steels has the form of intermetallic compounds $Fe_3Al$, $NiAl$, or $NiAl_2$. The aluminide coating consists of a surface layer about 0.001 inches thick and a subsurface layer about 0.0005 inches thick. Electron microphone analysis of the aluminide coating on type 304 stainless steel reveals the surface layer to be 60% Fe, 9% Cr, 6% Ni, 1.2% Mn, and 23.8% Al. The subsurface layer contains less iron, more nickel, and more aluminum. The base metal contains up to 1.5% aluminum to a depth of 10 microns. The nickel aluminide and iron aluminide layers have been shown to be extremely resistant to corrosion by sodium at temperatures as high as 700° C.

This invention may be advantageously applied several places in a nuclear reactor. Since the control pins of a reactor are the primary tritium source, the application of the subject invention to control pins would sharply decrease tritium additions to the primary loop sodium. Since the secondary tritium source is tertiary fission in reactor fuel, the aluminide coating on fuel pins would offer additional control of tritium as it is generated.

An aluminide coating on intermediate heat exchanger tubes would sharply decrease tritium migration from the primary sodium loop to the secondary sodium loop. This form of tritium migration may be an important concern as molten sodium will remove the normal oxide coating found on metal surfaces, thus permitting greater than normal hydrogen permeation. For example, the tritium permeation rate between the primary and secondary sodium systems of the Experimental Breeder reactor II is about 100 times faster than tritium loss through containment.

The aluminide layer applied to steam generator tubes in the secondary sodium system would not only attenuate tritium escape from the reactor to the steam system, but would stop diffusion of hydrogen from steam generator surface reactions into the secondary sodium system.

This invention would also be useful with molten lithium systems which are proposed for use in fusion reactors. In such reactors, the need for a hydrogen barrier may even be greater than in a fission reactor, since one of the main reacting species may be tritium, and since proposed fusion reactors would, of necessity, breed more tritium.

Similar coatings have been proposed for different purposes. For example, an aluminide coating for a $^{54}$Mn diffusion barrier is described in copending patent application Ser. No. 041,273 filed May 21, 1979. An aluminide coating process for inhibiting alkali metal corrosion is described in copending patent application Ser. No. 074,288 filed Sept. 11, 1979.

EXAMPLE

Test diffusers were fabricated from 0.125-inch diameter 304L stainless steel tubing having 0.016-inch wall thickness. Each diffuser was formed into a helical coil and immersed in molten sodium containing tritium. Permeation of tritium through the tubing wall was measured by monitoring tritium concentration in the interior of the tube. In a test comparing untreated oxidized diffusers with those having a diffused aluminide barrier, at a hydrogen partial pressure of 10 Torr and a temperature of 550° C., it was found that the untreated diffuser showed a permeation rate of 120 STD cc/sec/cm$^2$/mm $\times 10^{-8}$, while the treated diffuser showed a permeation rate of 0.7 STD cc/sec/cm$^2$/mm $\times 10^{-8}$.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A method for minimizing the diffusion of hydrogen and its isotopes through a metal wall comprising: diffusing aluminum into said metal wall, forming an intermetallic aluminide barrier coating, and placing said barrier in contact with molten alkali metal containing hydrogen.

2. The method of claim 1 wherein the metal is an austenitic, ferritic, or nickel-rich alloy.

3. The method of claim 1 wherein said metal wall is a component in a liquid metal fast breeder reactor containing liquid sodium as a coolant, said hydrogen permeation resistant barrier is formed on said wall, and said liquid sodium is in contact with said barrier.

4. The method of claim 1 wherein said metal wall is a component in a fusion reactor containing liquid lithium as a coolant, said hydrogen permeation resistant barrier is formed on said wall, and said liquid lithium is in contact with said barrier.

5. The method of claim 1 wherein said hydrogen permeation resistant aluminide coating comprises intermetallic compounds of $Ni_3Al$, $NiAl$, or $NiAl_2$.

6. The method of claim 1 wherein said hydrogen permeation resistant barrier comprises intermetallic compounds of $Fe_3Al$, $FeAl$, or $Fe_3Al_2$.

7. A hydrogen diffusion resistant component for a liquid metal fast breeder reactor or a fusion reactor containing molten alkali metal as a coolant, in which said component is subjected to an environment of molten alkali metal and hydrogen, comprising:
   a. a metal wall of an austenitic, ferritic, or nickel-rich alloy; and
   b. a hydrogen permeation resistant intermetallic aluminide coating of $Fe_3Al$, $FeAl$, $Fe_3Al_2$, $Ni_3Al$, $NiAl$, or $AiAl_2$ formed by the diffusion of aluminum into a surface of said metal wall.

* * * * *